US012204379B2

(12) United States Patent
Jeon et al.

(10) Patent No.: US 12,204,379 B2
(45) Date of Patent: Jan. 21, 2025

(54) ELECTRONIC DEVICE INCLUDING PRINTING FILM

(71) Applicant: SAMSUNG ELECTRONICS CO., LTD., Suwon-si (KR)

(72) Inventors: Hwanju Jeon, Suwon-si (KR); Jungtaek Lee, Suwon-si (KR); Sunghoon Cho, Suwon-si (KR); Sunyoung Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 246 days.

(21) Appl. No.: 17/883,259

(22) Filed: Aug. 8, 2022

(65) Prior Publication Data

US 2022/0382333 A1    Dec. 1, 2022

Related U.S. Application Data

(63) Continuation of application No. PCT/KR2021/001530, filed on Feb. 5, 2021.

(30) Foreign Application Priority Data

Feb. 7, 2020    (KR) .................. 10-2020-0014679

(51) Int. Cl.
*G06F 1/16*    (2006.01)
*B41M 1/34*    (2006.01)
(Continued)

(52) U.S. Cl.
CPC ............. *G06F 1/1656* (2013.01); *B41M 1/34* (2013.01); *B41M 3/003* (2013.01); *G02B 1/04* (2013.01); *G02B 1/14* (2015.01)

(58) Field of Classification Search
None
See application file for complete search history.

(56) References Cited

U.S. PATENT DOCUMENTS 9,342,105 B2 *    5/2016    Choi ................... G06F 1/1637
11,216,094 B2 *    1/2022    Ahn ..................... G06F 1/206
(Continued)

FOREIGN PATENT DOCUMENTS

KR    10-2010-0107731 A    10/2010
KR    10-0996199 B1    11/2010
(Continued)

OTHER PUBLICATIONS

Communication dated May 26, 2021, issued by the International Searching Authority in counterpart International Application No. PCT/KR2021/001530 (PCT/ISA/210).
(Continued)

*Primary Examiner* — Anthony Q Edwards
*Assistant Examiner* — Rashen E Morrison
(74) *Attorney, Agent, or Firm* — Sughrue Mion, PLLC

(57) ABSTRACT

An electronic device includes a housing including a translucent ceramic member; and a printing film provided on the housing, wherein the printing film includes: an adhesive layer provided on the ceramic member; a base layer including a first surface facing the adhesive layer and a second surface opposite to the first surface; a printing layer provided on the first surface or the second surface of the base layer, the printing layer being viewable through the ceramic member and the adhesive layer; and a shielding printing layer facing the second surface of the base layer.

15 Claims, 13 Drawing Sheets

(51) Int. Cl.
*B41M 3/00* (2006.01)
*G02B 1/04* (2006.01)
*G02B 1/14* (2015.01)

(56) References Cited

U.S. PATENT DOCUMENTS

| | | |
|---|---|---|
| 2015/0003028 A1 | 1/2015 | Chiang et al. |
| 2015/0307405 A1* | 10/2015 | Huguet .................. C04B 41/85 |
| | | 264/603 |
| 2016/0113135 A1 | 4/2016 | Kim et al. |
| 2018/0364846 A1* | 12/2018 | Ahn ........................ G06F 1/203 |
| 2019/0174658 A1* | 6/2019 | Qi .......................... G06F 1/1656 |
| 2021/0291493 A1* | 9/2021 | Kim .......................... B32B 1/00 |

FOREIGN PATENT DOCUMENTS

| | | |
|---|---|---|
| KR | 10-1420614 B1 | 7/2014 |
| KR | 10-2016-0046119 A | 4/2016 |
| KR | 10-2016-0096402 A | 8/2016 |
| KR | 10-2017-0112708 A | 10/2017 |
| KR | 10-2018-0026834 A | 3/2018 |

OTHER PUBLICATIONS

Communication dated May 26, 2021, issued by the International Searching Authority in counterpart International Application No. PCT/KR2021/001530 (PCT/ISA/237).
Communication dated Jun. 21, 2024, issued by the Korean Intellectual Property Office in Korean Patent Application No. 10-2020-0014679.

* cited by examiner

12,204,379 B2

ELECTRONIC DEVICE INCLUDING PRINTING FILM

CROSS-REFERENCE TO RELATED APPLICATION

This application is a bypass continuation application of International Application No. PCT/KR2021/001530, filed on Feb. 5, 2021, which is based on and claims priority to Korean Patent Application No. 10-2020-0014679, filed on Feb. 7, 2020, in the Korean Intellectual Property Office, the disclosures of which are incorporated by reference herein in their entireties.

BACKGROUND

1. Field

The disclosure relates to an electronic device including a printing film.

2. Description of Related Art

As electronic devices are highly integrated, and high-speed, high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling or e-wallet function.

As a recent trend is focusing on making portable electronic devices small and slim, ongoing research efforts are being made to give a more aesthetic look to the electronic device.

To implement a better aesthetic look for the electronic device with an exterior material, design demand for ceramic texture to give a silky feeling is increasing. The housing forming the exterior of the electronic device may come in various colors or patterns for a better appearance. In the case where the housing is formed of ceramic, the color or pattern of the housing may be varied by changing the composition of the ceramic powder. However, changing of the composition of the ceramic depending on the product design may result in deterioration of productivity and an increase in manufacturing costs due to increased manufacturing processes. Further, when a color or pattern is implemented directly on ceramic, the range of representing a color or pattern may be limited.

SUMMARY

Provided is an electronic device including a housing including a ceramic member formed in a structure in which a printing film is visible from the outside.

Further, provided is an electronic device in which the printing film may externally display at least one of the color, pattern, or text.

Additional aspects will be set forth in part in the description which follows and, in part, will be apparent from the description, or may be learned by practice of the presented embodiments According to an aspect of the disclosure, an electronic device includes: a housing including a translucent ceramic member; and a printing film provided on the housing, wherein the printing film includes: an adhesive layer provided on the ceramic member; a base layer including a first surface facing the adhesive layer and a second surface opposite to the first surface; a printing layer provided on the first surface or the second surface of the base layer, the printing layer being viewable through the ceramic member and the adhesive layer; and a shielding printing layer facing the second surface of the base layer.

The ceramic member may be a uniform color.

A thickness of the base layer may be 25 μm to 100 μm.

A thickness of the adhesive layer may be 5 μm to 50 μm.

The printing layer may be provided on the first surface of the base layer, and the shielding printing layer may be provided on the second surface of the base layer.

The printing layer may be provided on the second surface of the base layer, and the shielding printing layer contacts the printing layer.

The ceramic member includes yttria-stabilized zirconia (YSZ).

A light transmittance of the ceramic member may be 40% to 60%.

The housing may further include a front plate, a rear plate formed by the ceramic member, and a side member surrounding a space between the front plate and the rear plate.

The base layer may include polyethylene terephthalate (PET).

The printing layer may be formed on the printing layer by at least one of gravure printing, transfer printing, ultraviolet printing, or digital printing.

The ceramic member may include a third surface exposed to an outside of the electronic device and a fourth surface facing the adhesive layer, and a plurality of recesses may be formed in at least a portion of the third surface.

The printing layer may include a first area, a second area, and a third area, and the first area, the second area, and the third area may be different colors from each other.

At least one of a color, a pattern, or a character may be printed on the printing layer.

The printing layer may include a first printing layer provided on the first surface of the base layer and a second printing layer provided on the second surface of the base layer.

According to various embodiments of the disclosure, the electronic device may provide various colors or patterns in the same type of housing, enhancing productivity and saving manufacturing costs.

According to various embodiments of the disclosure, the electronic device may display a detailed color or pattern by using a color- or pattern-printed printing film.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
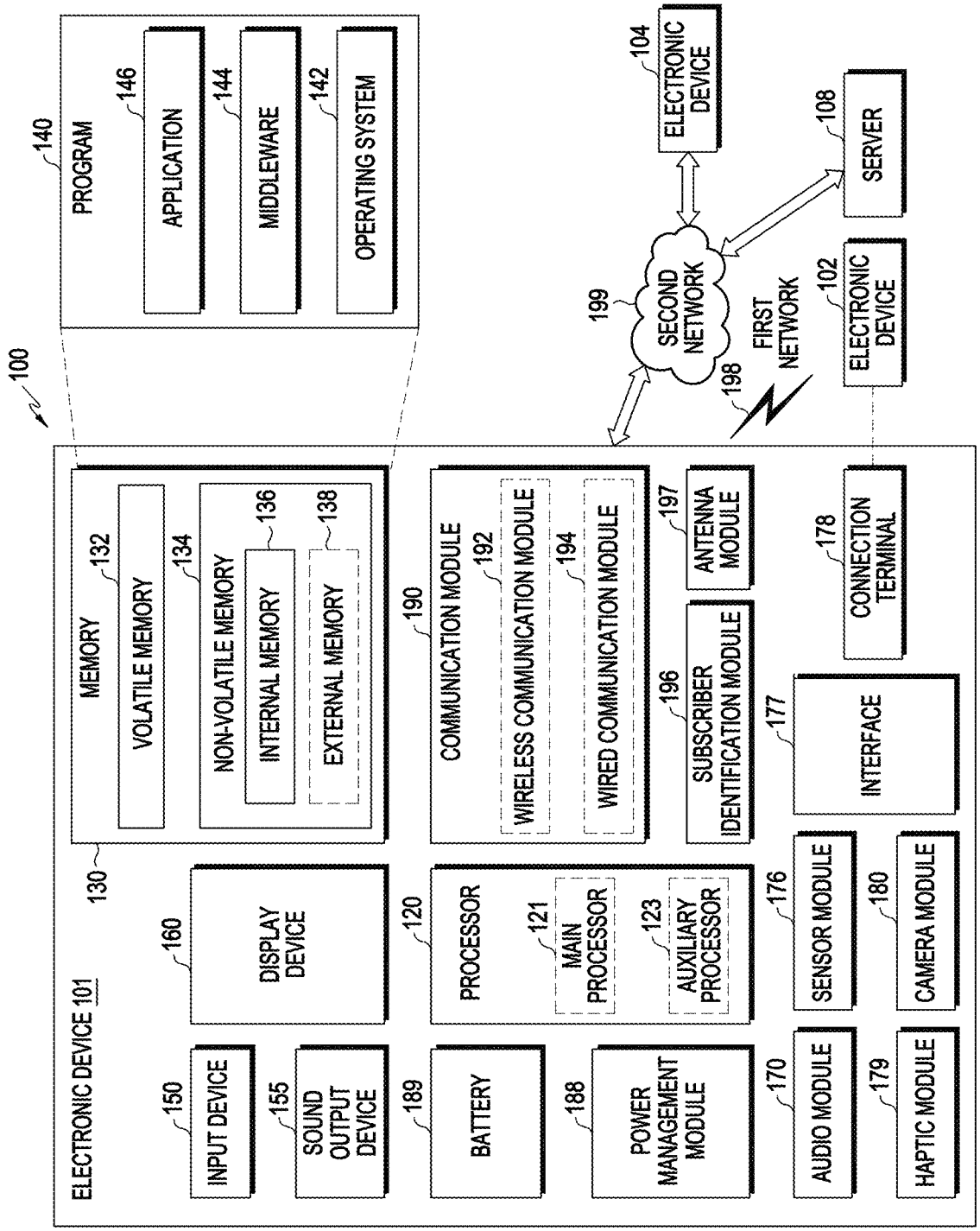
FIG. 1 is a block diagram illustrating an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output unit 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output unit 155 may output sound signals to the outside of the electronic device 101. The sound output unit 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output unit 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102 and 104 or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
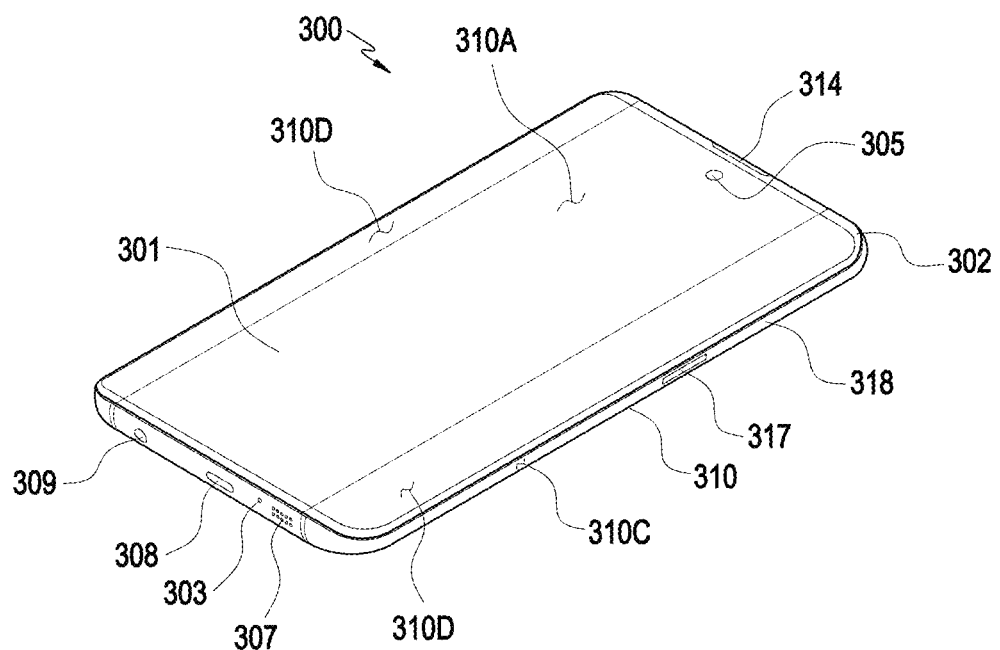
FIG. 2 is a front perspective view illustrating an electronic device according to various embodiments of the disclosure.
Figure 3:
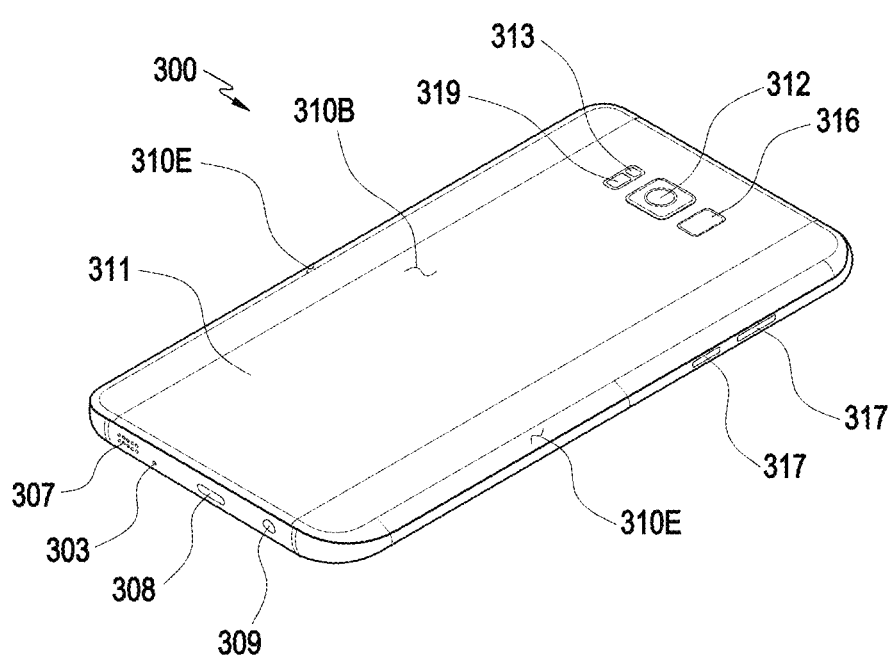
FIG. 3 is a rear perspective view illustrating an electronic device according to various embodiments of the disclosure.

FIG. 2 is a front perspective view illustrating an electronic device 300 according to various embodiments of the disclosure. FIG. 3 is a rear perspective view illustrating an electronic device 300 according to various embodiments of the disclosure.

Referring to FIGS. 2 and 3, according to an embodiment, an electronic device 300 may include a housing 310 (e.g., the housing 310 of FIGS. 2 and 3) including a front surface 310A, a rear surface 310B, and a side surface (e.g., the side surface 310C of FIGS. 2 and 3) surrounding a space between the front surface 310A and the rear surface 310B. According to another embodiment, the housing 310 may denote a structure forming the first surface (e.g., the front surface 310A of FIG. 2), the second surface (e.g., the rear surface 310B of FIG. 3), and some of the side surfaces 310C of FIG. 2. According to an embodiment, at least part of the front surface 310A may have a substantially transparent front plate 302 (e.g., a glass plate or polymer plate including various coating layers). The rear surface 310B may be formed by a rear plate 311. The rear plate 311 may be formed of, e.g., laminated or colored glass, ceramic, polymer, metal (e.g., aluminum, stainless steel (STS), or magnesium), or a combination of at least two thereof. The side surface 310C may be formed by a side bezel structure (or a "side member") 318 that couples to the front plate 302 and the rear plate 311 and includes a metal and/or polymer. According to an embodiment, the rear plate 311 and the side bezel structure 318 may be integrally formed together and include the same material (e.g., ceramic).

In the embodiment illustrated, the front plate 302 may include two first edge areas 310D, which seamlessly and bendingly extend from the first surface 310A to the rear plate 311, on both the long edges of the front plate 302. In the embodiment (refer to FIG. 3) illustrated, the rear plate 311 may include two second edge areas 310E, which seamlessly and bendingly extend from the rear surface 310B to the front plate, on both the long edges. According to an embodiment, the front plate 302 (or the rear plate 311) may include only one of the first edge areas 310D (or the second edge areas 310E). Alternatively, the first edge areas 310D or the second edge areas 301E may partially be excluded. According to an embodiment, at side view of the electronic device 300, the side bezel structure 318 may have a first thickness (or width) for sides that do not have the first edge areas 310D or the second edge areas 310E and a second thickness, which is smaller than the first thickness, for sides that have the first edge areas 310D or the second edge areas 310E.

According to an embodiment, the electronic device 300 may include at least one or more of a display 301, audio modules 303, 307, and 314, sensor modules 316 and 319, camera modules 305 and 312, key input devices 317, and connector holes 308 and 309. According to an embodiment, the electronic device 300 may exclude at least one (e.g., the key input device 317) of the components or may add other components.

The display 301 may be exposed through a significant portion of the front plate 302. According to an embodiment, at least a portion of the display 301 may be exposed through the front plate 302 forming the front surface 310A and the first edge areas 310D of the side surface 310C. According to an embodiment, the edge of the display 301 may be formed to be substantially the same in shape as an adjacent outer edge of the front plate 302. According to another embodiment, the interval between the outer edge of the display 301 and the outer edge of the front plate 302 may remain substantially even to give a larger area of exposure the display 301.

In another embodiment, a recess or opening may be formed in a portion of the screen display area of the display 301, and at least one or more of the camera module 305 and a sensor module aligned with the recess or the opening may be included. According to another embodiment, at least one or more of the audio module 314, sensor module, camera module 305, fingerprint sensor 316, and light emitting device may be included on the rear surface of the screen display area of the display 301. According to an embodiment, the display 301 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 316 and 319 and/or at least part of the key input device 317 may be disposed in the first edge areas 310D and/or the second edge areas 310E.

The audio modules 303, 307, and 314 may include, e.g., a microphone hole 303 and speaker holes 307 and 314. The microphone hole 303 may have a microphone inside to obtain external sounds. According to an embodiment, there may be a plurality of microphones to be able to detect the direction of a sound. The speaker holes 307 and 314 may include an external speaker hole 307 and a phone receiver hole 314. In some embodiments, the speaker holes 307 and 314 and the microphone hole 303 may be implemented as a single hole, or a speaker may be included without the speaker holes 307 and 314 (e.g., a piezo speaker).

The sensor modules 316 and 319 may generate an electrical signal or data value corresponding to, e.g., an internal operating state or external environmental state of the electronic device 300. The sensor modules 316 and 319 may include a first sensor module (e.g., a proximity sensor) and/or a second sensor module (e.g., a fingerprint sensor) disposed on the front surface 310A of the housing 310 and/or a third sensor module 319 (e.g., an HRM sensor) and/or a fourth sensor module 316 (e.g., a fingerprint sensor) disposed on the rear surface 310B of the housing 310. The fingerprint sensor may be disposed on the second surface 310A as well as on the first surface 310B (e.g., the display 301) of the housing 310. The electronic device 300 may further include sensor modules, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305 and 312 may include a first camera module 305 disposed on the front surface 310A of the electronic device 300, and a rear camera device 312 and/or a flash 313 disposed on the rear surface 310B. The camera modules 305 and 312 may include one or more lenses, an image sensor, and/or an image signal processor. The flash 313 may include, e.g., a light emitting diode (LED) or a xenon lamp. According to an embodiment, two or more lenses (an infrared (IR) camera, a wide-angle lens, and a telephoto lens) and image sensors may be disposed on one surface of the electronic device 300.

The connector holes 308 and 309 may include, e.g., a first connector hole 308 for receiving a connector (e.g., a universal serial bus (USB) connector) for transmitting or receiving power and/or data to/from an external electronic device and/or a second connector hole 309 (e.g., an earphone jack) for receiving a connector for transmitting or receiving audio signals to/from the external electronic device.

Figure 4:
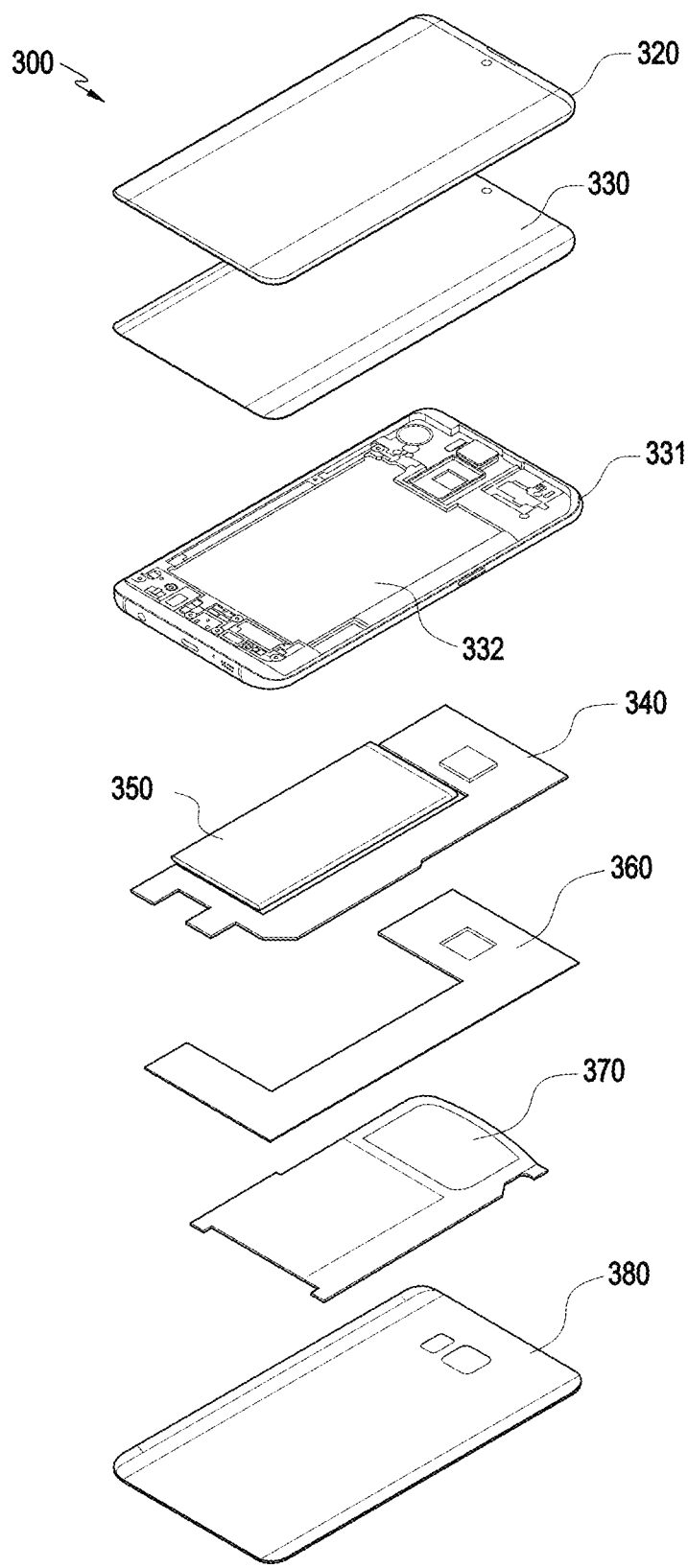
FIG. 4 is an exploded perspective view illustrating an electronic device according to various embodiments of the disclosure.

FIG. 4 is an exploded perspective view illustrating an electronic device 300 according to various embodiments.

Referring to FIG. 4, an electronic device 300 (e.g., the electronic device 300 of FIGS. 2 and 3) may include a side bezel structure 331 (e.g., the side bezel structure 318 of FIG. 2), a first supporting member 332 (e.g., a bracket), a front plate 320 (e.g., the front plate 302 of FIG. 2), a display 330 (e.g., the display 301 of FIG. 2), a printed circuit board 340, a battery 350, a second supporting member 360 (e.g., a rear case), an antenna 370, and/or a rear plate 380 (e.g., the rear plate 311 of FIG. 3). According to an embodiment, the electronic device 300 may exclude at least one (e.g., the first supporting member 332 or the second supporting member 360) of the components or may add other components. At least one of the components of the electronic device 300 may be the same or similar to at least one of the components of the electronic device 300 of FIG. 2 or 3 such that duplicate description will not be made below.

The first supporting member 332 may, e.g., be disposed inside the electronic device 300 to be connected with the side bezel structure 331 or integrated with the side bezel structure 331. The first supporting member 332 may be formed of, e.g., a metallic material and/or non-metallic material (e.g., polymer). The display 330 may be joined onto one surface of the first supporting member 332, and the printed circuit board 340 may be joined onto the opposite surface of the first supporting member 232.

For example, a processor, memory, and/or interface may be mounted on the printed circuit board 340. The processor may include one or more of, e.g., a central processing unit, an application processor, a graphic processing device, an image signal processing, a sensor hub processor, or a communication processor. The memory may include a volatile or non-volatile memory. The interface may include, e.g., a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multimedia card (MMC) connector, or an audio connector.

The battery 350 may be a device for supplying power to at least one component of the electronic device 300. The battery 450 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 300.

The second supporting member 360 (e.g., a rear case) may be disposed between the printed circuit board 340 and the antenna 370. According to an embodiment, the second supporting member 360 may include one surface to which at least one of the printed circuit board 340 and the battery 350 is coupled, and another surface to which the antenna 370 is coupled.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment of the present invention, an antenna structure may be formed by a portion or combination of the side bezel structure 331 and/or the first supporting member 332.

Figure 5:
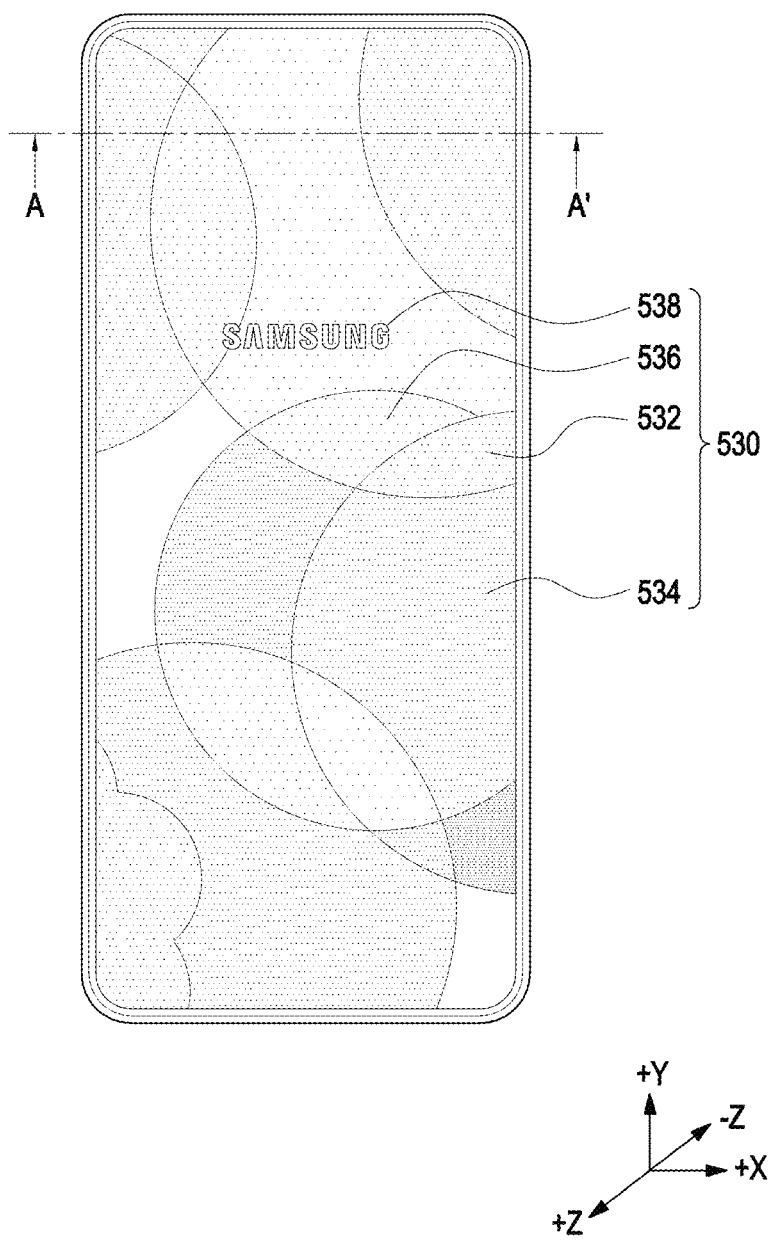
FIG. 5 is a rear view illustrating an electronic device according to various embodiments of the disclosure.
Figure 6:
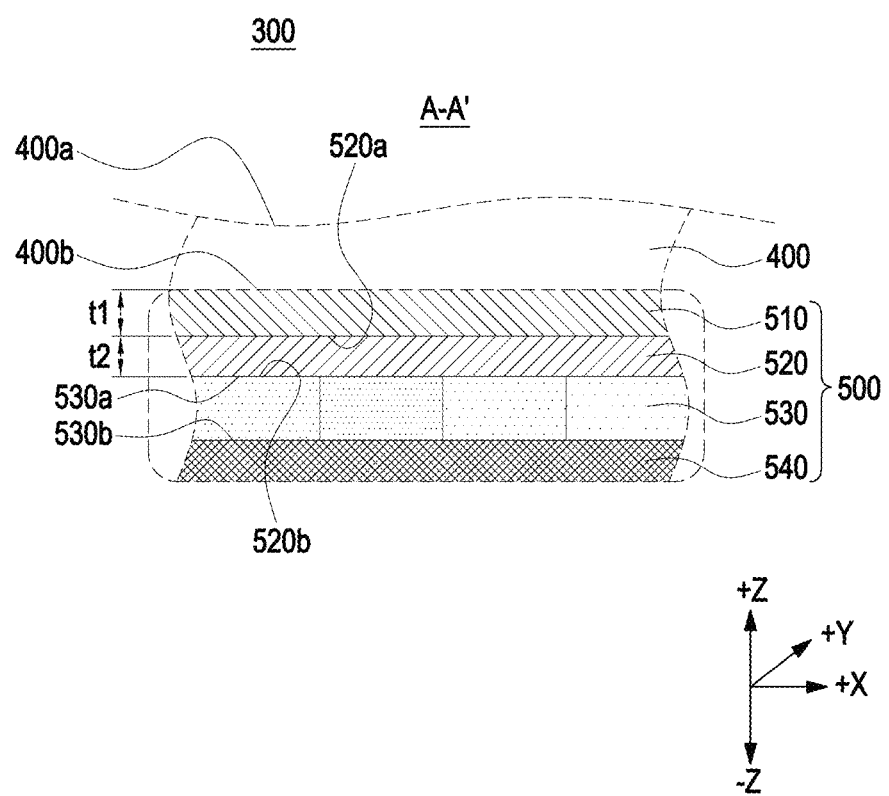
FIG. 6 is a cross-sectional view taken along line A-A' of FIG. 5.
Figure 7:
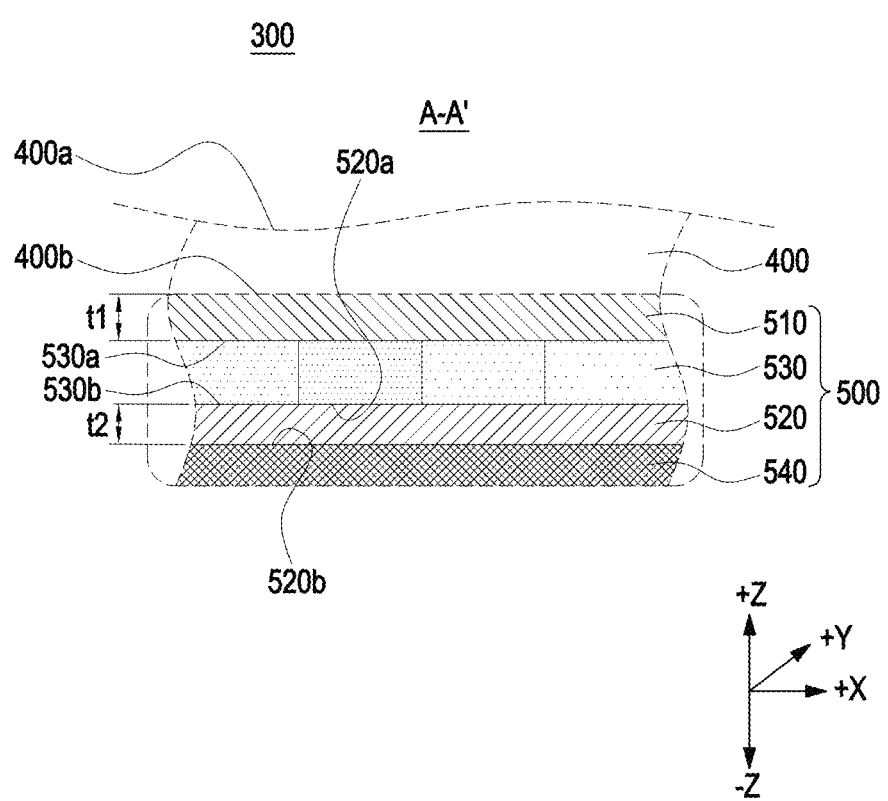
FIG. 7 is a cross-sectional view taken along line A-A' of FIG. 5.
Figure 8:
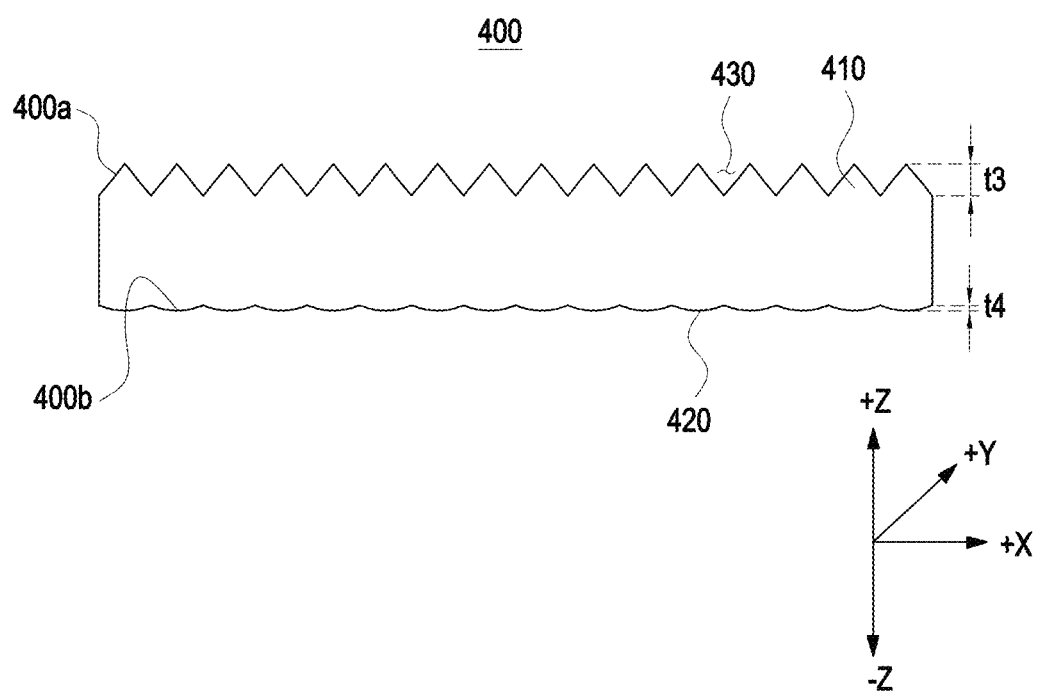
FIG. 8 is a view illustrating the ceramic member of FIG. 6.

FIG. 5 is a rear view illustrating an electronic device according to various embodiments of the disclosure. FIG. 6 is a cross-sectional view taken along line A-A' of FIG. 5. FIG. 7 is a cross-sectional view taken along line A-A' of FIG. 4. FIG. 8 is a view illustrating the ceramic member of FIG. 6.

Referring to FIGS. 5 to 8, the electronic device 300 may include a ceramic member 400 and a printing film 500. The configuration of the ceramic member 400 of FIGS. 5 to 8 may be identical in whole or part to the configuration of the rear plate 311 of FIGS. 2 and 3.

According to various embodiments, the ceramic member 400 may form at least a portion of the exterior of the electronic device 300. For example, the ceramic member 400 may mean a structure forming the rear surface (e.g., the rear surface 310B of FIG. 3) of the electronic device 300 of the housing (e.g., the housing 310 of FIGS. 2 and 3).

According to various embodiments, the ceramic member 400 may be formed to be translucent. For example, the printing film 500 disposed under the ceramic member 400 may be visible from the outside of the electronic device 300 through the ceramic member 400. According to an embodiment, the light transmittance of the ceramic member 400 may be formed to have 40% to 60%.

According to various embodiments, the ceramic member 400 may be formed overall in a uniform color. For example, the hue, saturation, or brightness of the ceramic member 400 may be uniformly formed as a whole, and the shape exposed to the outside of the electronic device 300 may be determined based on a printing layer 530. According to an embodiment, the ceramic member 400 may not include different types of powder for displaying different colors, saturations, or brightnesses in the ceramic member 400.

According to various embodiments, the ceramic member 400 may include zirconium oxide (zirconia ($ZrO_2$)). According to an embodiment, the ceramic member 400 may include yttria-stabilized zirconia (YSZ) formed as a combination of zirconium oxide ($ZrO_2$) and yttria ($Y_2O_3$). The yttria-stabilized zirconia may have a particle size of 60 μm to 75 μm. The ceramic member 400 including zirconia ($ZrO_2$) may have high chemical resistance, high wear resistance, and high stress.

According to various embodiments, the ceramic member 400 may include a third surface 400a and a fourth surface 400b. The third surface 400a is the upper surface of the ceramic member 400 and is exposed to the outside of the electronic device 300. The fourth surface 400b is the lower surface of the ceramic member 400 and may be a surface facing the adhesive layer 510.

According to various embodiments, the ceramic member 400 may have various surface roughnesses. For example, the surface roughness of the third surface 400a of the ceramic member 400 may be larger than the surface roughness of the fourth surface 400b.

According to various embodiments, the third surface 400a may have various surface roughnesses. For example, the third surface 400a may include at least one first protrusion 410 formed to have a third thickness t3 larger than 0 mm and less than or equal to 0.3 mm. As another example, the third surface 400a of the ceramic member 400 may include a plurality of recesses 430. The recess 430 may be an opening or hole passing through at least a portion of the third surface 400a or a groove formed in the third surface 400a. The first protrusion 410 and the recess 430 may be formed by sand blasting. The third surface 400a may provide the user with various images using the light transmittance that is changed based on the third thickness t3 of the first protrusion 410.

According to various embodiments, the fourth surface 400b may be formed to have a substantially uniform surface roughness for bonding with the printing film 500. For example, the fourth surface 400b may include at least one second protrusion 420 formed to have a fourth thickness t4 larger than 0 mm and less than or equal to 0.02 mm.

According to various embodiments, the ceramic member 400 may have various surface roughnesses to have a preset light transmittance (e.g., 40% to 60%). For example, at least one of the third surface 400a or the fourth surface 400b of the ceramic member 400 may have various surface roughnesses to adjust the rates of specular reflection and diffuse reflection. According to an embodiment, as the surface roughness of at least one of the third surface 400a and the fourth surface 400b decreases, the rate of specular reflection of light toward the ceramic member 400 may increase.

According to various embodiments, the ceramic member 400 may have various densities. For example, the density of the ceramic member 400 may be 6.00 g/cm³ to 6.20 g/cm³. The ceramic member 400 may have a higher density than the synthetic resin and may thus have lower thermal conductivity than the synthetic resin.

According to various embodiments, the ceramic member 400 may be included in the rear plate (e.g., the rear plate 311 of FIG. 3) forming at least a portion of the outer surface of the electronic device 300. For example, the rear plate 311 may be formed of the ceramic member 400.

According to various embodiments, the printing film 500 may include an adhesive layer 510, a base layer 520, a printing layer 530, and a shielding printing layer 540.

According to various embodiments, the printing film 500 may prevent the ceramic member 400 from scattering. For example, the printing film 500 may include the adhesive layer 510 for bonding to the ceramic member 400 and the base layer 520 bonded to the ceramic member 400 by the adhesive layer 510. When the ceramic member 400 is broken by an external impact, scattering of fragments of the ceramic member 400 may be prevented by the base layer 520 bonded to the ceramic member 400.

According to various embodiments, the adhesive layer 510 may be disposed under the ceramic member 400. For example, the adhesive layer 510 may be an outermost layer in the printing film 500. The adhesive layer 510 is a layer including an adhesive material and may bond the printing film 500 to the ceramic member 400.

According to various embodiments, the adhesive layer 510 may be formed of various materials. For example, the adhesive layer 510 may be formed of a substantially transparent material so that the printing layer 530 may be visible from the outside of the electronic device 300. For example, the light transmittance of the adhesive layer 510 may be 91% or more and less than 100%. The haze of the adhesive layer 510 may be larger than 0% and less than or equal to 1%. The haze may be a degree to which light incident on a transparent material is scattered.

According to an embodiment, the adhesive layer 510 may be formed of an optically clear adhesive (OCA). According to another embodiment, the adhesive layer 510 may be formed of an optically clear resin (OCR).

According to various embodiments, the adhesive layer 510 may be formed in various thicknesses. For example, the adhesive layer 510 may be formed in various thicknesses considering downsizing of the electronic device, the bonding strength between the ceramic member 400 and the printing film 500, and the light transmittance of the adhesive layer 510. According to an embodiment, the first thickness t1 that is the thickness of the adhesive layer 510 may be 5 μm to 50 μm. The thickness of the adhesive layer 510 may be substantially 15 μm.

According to various embodiments, the base layer 520 may be formed of various materials. For example, the base layer 520 may be formed considering at least one of transparency, strength, and hardness. According to an embodiment, the base layer 520 may be formed of polyethylene terephthalate (PET). For example, the base layer 520 may include at least one of oriented polyethylene terephthalate (OPET) or amorphous polyethylene terephthalate (APET).

According to various embodiments, the base layer 520 may be formed in various thicknesses. For example, the base layer 520 may be formed to have various thicknesses considering the downsizing of the electronic device, preventing the scattering of the ceramic member 400, and the light transmittance of the base layer 520. According to an embodiment, the second thickness t2 that is the thickness of the base layer 520 may be 25 µm to 100 µm. The thickness of the base layer 520 may be substantially 50 µm.

According to various embodiments, the thicknesses of the adhesive layer 510 and the base layer 520 may be formed considering the visibility of the printing layer 530. For example, the sum of the thicknesses of the adhesive layer 510 and the base layer 520 may be 30 µm to 150 µm or less, so that the printing layer 530 is visible from the outside of the electronic device 300.

According to various embodiments, the base layer 520 may be formed in a plate-shaped film structure. For example, the base layer 520 may include a first surface 520*a* facing the adhesive layer 510 and a second surface 520*b* formed opposite to the first surface.

According to various embodiments, the printing film 500 may provide various images to the user. For example, the printing film 500 may include the printing layer 530 printed with at least one of a color, a pattern, or a character.

According to various embodiments, the printing layer 530 may be formed in various positions. For example, the printing layer 530 may be formed on at least one of the first surface 520*a* of the base layer or the second surface 520*b* of the base layer.

According to various embodiments, the printing layer 530 may be formed on the second surface 520*b* which is the lower surface of the base layer 520. For example, the first surface 520*a* which is the upper surface of the base layer 520 may face the adhesive layer 510, and the second surface 520*b* which is the lower surface of the base layer 520 may face the fifth surface 530*a* which is the upper surface of the printing layer 530. The printing layer 530 may be positioned in the second direction (−Z direction) with respect to the base layer 520. According to an embodiment, when the printing layer 530 is positioned in the second direction (−Z direction) with respect to the base layer 520, the printing layer 530 may be visible from the outside of the electronic device 300 through the base layer 520, the adhesive layer 510, and the ceramic member 400.

According to various embodiments, when the printing layer 530 is formed on the second surface 520*b* of the base layer 520, since the adhesive layer and the base layer 520 which is substantially overall uniform are bonded to each other, the adhesive layer 510 and the base layer 520 may be stably bonded. For example, the stability of the printing film 500 in which the printing layer 530 is formed on the second surface 520*b* of the base layer 520 may be larger than the stability of the printing film 500 in which the printing layer 530 is formed on the first surface 520*a* of the base layer 520.

According to various embodiments, the printing layer 530 may be formed on the first surface 520*a* which is the upper surface of the base layer 520. For example, the first surface 520*a* which is the upper surface of the base layer 520 may face the printing layer 530, and the second surface 520*b* which is the lower surface of the base layer 520 may face the shielding printing layer 540. The fifth surface 530*a* which is the upper surface of the printing layer 530 may face the adhesive layer 510, and the sixth surface 530*b* which is the lower surface of the printing layer 530 may face the first surface 520*a* of the base layer 520. The printing layer 530 may be positioned in the first direction (+Z direction) with respect to the base layer 520. According to an embodiment, when the printing layer 530 is positioned in the first direction (+Z direction) with respect to the base layer 520, the printing layer 530 may be visible from the outside of the electronic device 300 through the adhesive layer 510 and the ceramic member 400.

According to various embodiments, the clearness of the printing layer 530 may be varied depending on the position of the printing layer 530. For example, the clearness of the printing layer 530 visible from the outside of the electronic device 300 when the printing layer 530 is formed on the first surface 520*a* of the base layer 520 may be larger than the clearness of the printing layer 530 visible from the outside of the electronic device 300 when the printing layer 530 is formed on the first surface 520*a* of the base layer 520.

According to various embodiments, the printing layer 530 may be formed on the base layer 520 by various methods. According to an embodiment, the printing layer 530 may be formed on the base layer 520 through gravure printing. The gravure printing may be performed using an engraved plate on at least one of the first surface 520*a* or the second surface 520*b* of the base layer 520. According to another embodiment, the printing layer 530 may be formed on the base layer 520 through transfer printing. The transfer printing may be performed using transfer paper on at least one of the first surface 520*a* or the second surface 520*b* of the base layer 520. According to another embodiment, the printing layer 530 may be formed on the base layer 520 through ultraviolet printing. The ultraviolet printing may be performed using UV ink including a curing agent, which is injected into at least one of the first surface 520*a* or the second surface 520*b* of the base layer 520. According to another embodiment, the printing layer 530 may be formed on the base layer 520 through digital printing. The digital printing may be performed using a computer on at least one of the first surface 520*a* or the second surface 520*b* of the base layer 520. The printing layer 530 may be formed by other processes than the above-described processes as long as they are capable of printing on the surface of the base layer 520.

According to various embodiments, the printing layer 530 may provide various images to the user. The printing layer 530 may include a plurality of areas formed in various colors. According to an embodiment, the printing layer 530 may include a first area 532 and a second area 534. The first area 532 and the second area 534 may differ in at least one of hue, saturation, and brightness. According to another embodiment, the printing layer 530 may include a first area 532, a second area 534, and a third area 536. The first area 532, the second area 534, and the third area 536 may differ in at least one of hue, saturation, and brightness. According to an embodiment, the first area 532, the second area 534, and the third area 536 may be positioned in substantially the same layer. For example, the first area 532, the second area 534, and the third area 536 may be positioned between the base layer 520 and the shielding printing layer 540. As another example, the first area 532, the second area 534, and the third area 536 may be positioned between the adhesive layer 510 and the base layer 520. Although FIG. 5 illustrates forming the printing layer 530 in three colors, forming the printing layer 530 in three colors is merely an example, and one of ordinary skill in the art may form the printing layer 530 in other various colors. For example, the printing layer 530 may include four or more colors.

According to various embodiments, the printing layer 530 may be formed to have a plurality of layers. According to an embodiment, the printing layer 530 may include a first printing layer (e.g., the printing layer 530 of FIG. 7) formed on the first surface 520*a* of the base layer 520 and a second printing layer (e.g., the printing layer 530 of FIG. 6) formed on the second surface 520*b* of the base layer 520. According to another embodiment, the printing layer 530 may be formed to have a plurality of layers between the base layer 520 and the shielding printing layer 540. According to another embodiment, the printing layer 530 may be formed to have a plurality of layers between the adhesive layer 510 and the base layer 520. When the printing layer 530 is formed to have a plurality of layers, the printing layer 530 may provide various images to the user. For example, when the user looks at the electronic device 300, the printing layer 530 may provide the user with a three-dimensional pattern to change the image obtained by the user based on the angle at which the user looks at the electronic device 300.

According to various embodiments, the printing layer 530 may be protected from external impact. For example, the printing layer 530 is not exposed to the outside of the electronic device 300 by at least one of the ceramic member 400, the adhesive layer 510, or the base layer 520 so that at least one of the color, pattern, or character formed on the printing layer 530 may be prevented from breakage, damage, wear or deformation.

According to various embodiments, the printing layer 530 may provide various pieces of information to the user. For example, the printing layer 530 may include a fourth area 538 for providing information about the electronic device 300 to the user. The fourth area 538 may be formed of characters for representing at least one of an international mobile equipment identity (IMEI) or the manufacturer's logo.

According to various embodiments, the shielding printing layer 540 may reduce visible exposure to the outside of the electronic component (e.g., the antenna 370 of FIG. 3) of the electronic device 300 disposed in the second direction (−Z direction). For example, the shielding printing layer 540 may include a substantially opaque ink or paint. According to an embodiment, when the user looks at the electronic device 300 of FIG. 5 in the second direction (−Z direction), the user may see the printing layer 530 but not the electronic component positioned under the shielding printing layer 540. For example, only the component of the electronic device 300 positioned in the first direction (+Z direction), rather than the shielding printing layer 540, may be visible to the user looking at the electronic device 300 in the second direction (−Z direction).

Figure 9A:
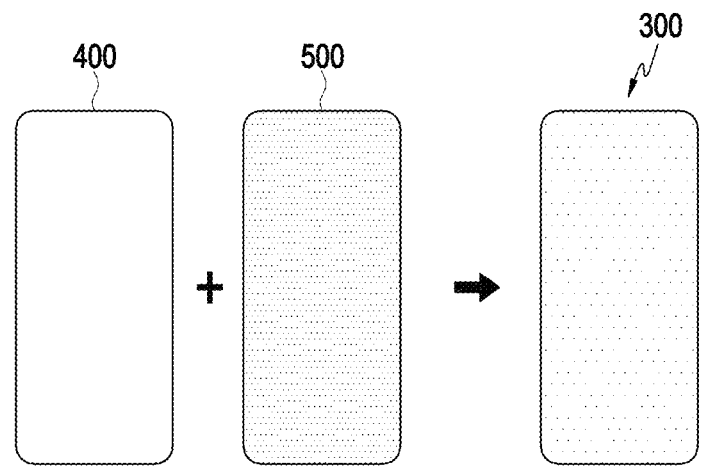
FIGS. 9A, 9B, and 9C are views schematically illustrating a printing film coupled with a ceramic member according to various embodiments of the disclosure.
Figure 9B:
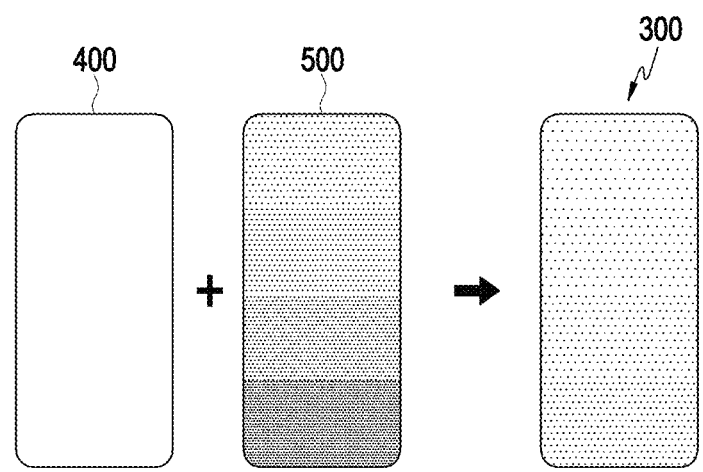
Figure 9C:
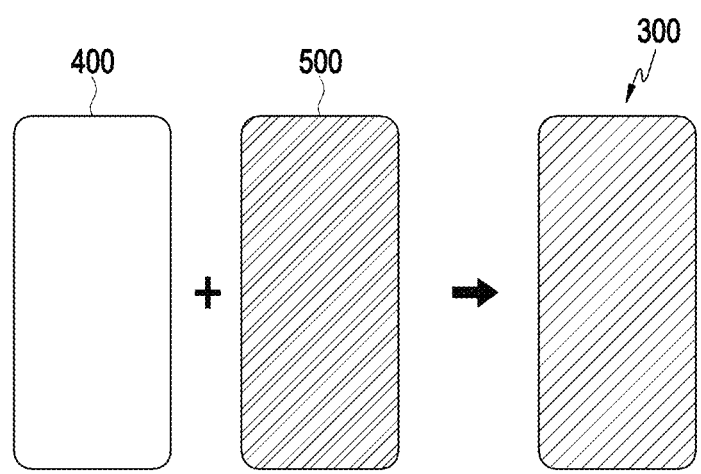

FIGS. 9A, 9B, and 9C are rear views illustrating an electronic device according to various embodiments of the disclosure.

Referring to FIGS. 9A, 9B, and 9C, the electronic device 300 may include a ceramic member 400 and a printing film 500. The configuration of the electronic device 300, the ceramic member 400, and the printing film 500 of FIGS. 9A, 9B, and 9C may be identical in whole or part to the configuration of the electronic device 300, the ceramic member 400, and the printing film 500 of FIGS. 4 to 7.

Referring to FIGS. 9A, 9B, and 9C, the printing film 500 may be visibly exposed to the outside of the electronic device 300. For example, the ceramic member 400 may be formed of a material capable of transmitting light, and the printing film 500 disposed under the ceramic member 400 may be visibly exposed to the outside of the electronic device 300 through the ceramic member 400.

Referring to FIGS. 9A, 9B, and 9C, the ceramic member 400 may be formed of a translucent material. The color of the printing film 500 may differ from the color shown to the outside of the electronic device 300 through the ceramic member 400.

According to FIGS. 9A and 9B, the printing film 500 may display various colors. According to FIG. 9A, the printing layer (e.g., the printing layer 530 of FIG. 5) included in the printing film 500 may be formed in substantially the same hue, saturation, and brightness. According to FIG. 8B, at least a portion of the printing layer (e.g., the printing layer 530 of FIG. 5) included in the printing film 500 may differ in at least one of hue, saturation, and brightness. According to an embodiment, the printing film 500 may be formed to have stepwise gradations of at least one of hue, saturation, or brightness. According to another embodiment, although FIG. 9B illustrates that the brightness of color of the printing film 500 is stepwise changed, at least one of the hue, saturation, or brightness of the printing film 500 may be continuously changed.

According to FIG. 9C, the printing film 500 may display various patterns. The pattern of the printing film 500 may be defined as a shape of a printing layer (e.g., the printing layer 530 of FIG. 5). According to an embodiment, a partial area of the printing layer 530 may be printed in ink but another area thereof may not be printed in ink. According to another embodiment, a partial area of the printing layer 530 may be printed in a first ink which has one color, and another area thereof may be printed in an ink of a second color different from the color of the first ink.

Figure 10:
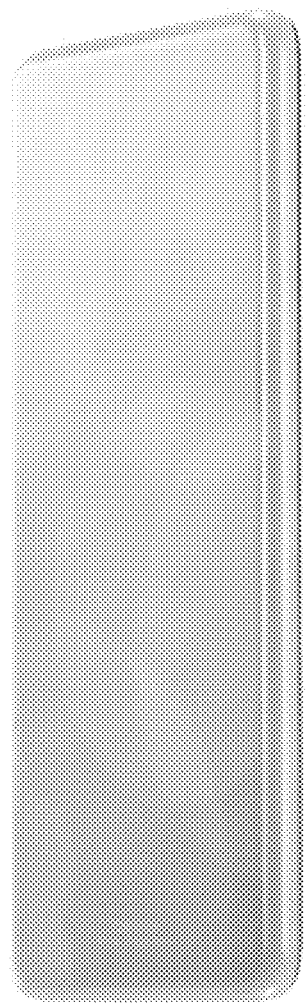
FIG. 10 is a view illustrating an electronic device according to various embodiments of the disclosure.

FIG. 10 is a view illustrating an electronic device according to various embodiments of the disclosure.

Referring to FIG. 10, the electronic device 300 may include various colors and patterns. The configuration of the electronic device 300 of FIG. 10 may be identical in whole or part to the configuration of the electronic device 300 of FIGS. 9A, 9B, and 9C.

According to various embodiments, the electronic device 300 may be formed in various colors to have an aesthetic look. For example, the rear surface (e.g., the rear surface 310B of FIG. 2) of the electronic device 300 may be formed to differ in at least one of the hue, saturation, and brightness. The rear surface 310B may be formed of a translucent ceramic member (e.g., the ceramic member 400 of FIG. 6).

According to various embodiments, the shape of the electronic device 300 may be determined by the image that the printing layer (e.g., the printing layer 530 of FIG. 5) positioned inside the ceramic member 400 provides to the user through the ceramic member 400. The aesthetic look of the electronic device 300 may be enhanced by the image provided by the printing layer 530.

Figure 11:
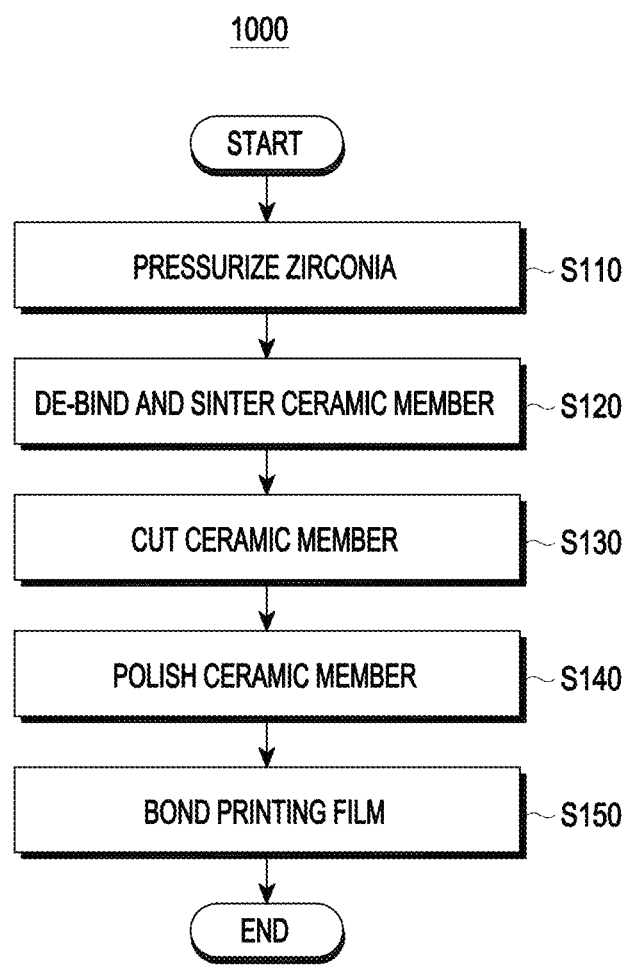
FIG. 11 is a flowchart illustrating a method for manufacturing an electronic device according to various embodiments of the disclosure.

FIG. 11 is a flowchart illustrating a method for manufacturing an electronic device according to various embodiments of the disclosure. Referring to FIG. 11, a method 1000 of manufacturing an electronic device may include the step S110 of pressurizing zirconia ($ZrO_2$), the step S120 of de-binding and sintering a ceramic member (e.g., the ceramic member 400 of FIG. 6), the step S130 of cutting the ceramic member 400, the step S140 of polishing the ceramic member 400, and the step S150 of bonding a printing film (e.g., the printing film 500 of FIG. 6) to the formed ceramic member 400. The configuration of the ceramic member and the printing film of FIG. 11 may be identical in whole or part to the configuration of the ceramic member 400 and the printing film 500 of FIGS. 6 and 7.

According to various embodiments, the step S110 of pressurizing zirconia ($ZrO_2$) may include the step of pressurizing yttria-stabilized zirconia (YSZ). The step of pressing the yttria-stabilized zirconia may include dry pressing and isostatic pressing.

According to various embodiments, the step S120 of de-binding and sintering the ceramic member (e.g., the ceramic member 400 of FIG. 6) may include a de-binding step of reducing the fat and oil of the ceramic member 400 and a sintering step of heating and bonding the pressurized ceramic member 400. The ceramic member 400 may be zirconia (ZrO$_2$) pressurized in the first step S110.

According to various embodiments, the step S130 of cutting the ceramic member (e.g., the ceramic member 400 of FIG. 6) may be performed using computer numerical control (CNC).

According to various embodiments, the surface roughness of the ceramic member 400 may be adjusted by the step S140 of polishing the ceramic member 400. According to an embodiment, the surface (e.g., the third surface 400a of FIG. 6) exposed to the outside of the electronic device (e.g., the electronic device 300 of FIG. 5) among the outer surfaces of the ceramic member 400 may have substantially the same surface roughness as the surface (e.g., the fourth surface 400b of FIG. 6) facing the inside of the electronic device 300. According to another embodiment, the surface roughness of the third surface 400a may be smaller than the surface roughness of the fourth surface 400b.

According to various embodiments, the step S150 of bonding the printing film (e.g., the printing film 500 of FIG. 6) may be performed by an adhesive layer (e.g., the adhesive layer 510 of FIG. 6) of the printing film 500. For example, as the adhesive layer 510 of the printing film 500 contacts the fourth surface 400b of the ceramic member 400, the ceramic member 400 and the printing film 500 may be bonded to each other.

Figure 12:
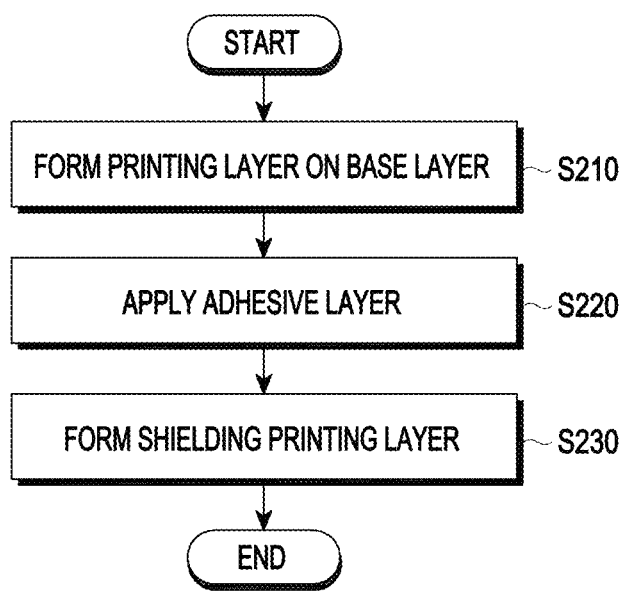
FIG. 12 is a flowchart illustrating a method for manufacturing a printing film according to various embodiments of the disclosure.

FIG. 12 is a flowchart illustrating a method for manufacturing a printing film according to various embodiments of the disclosure.

Referring to FIG. 12, a method 1100 for manufacturing a printing film 500 may include the step S210 of forming a printing layer on a base layer, the step S220 of applying an adhesive layer, and the step S230 of forming a shielding printing layer. The configuration of the adhesive layer, the base layer, the printing layer, and the shielding printing layer of FIG. 12 may be identical in whole or part to the configuration of the adhesive layer 510, the base layer 520, the printing layer 530, and the shielding printing layer 540 of FIGS. 6 and 7.

According to various embodiments, the step S210 of forming the printing layer on the base layer may be performed in various manners. For example, the printing layer 530 may be formed on one surface of the base layer 520. According to an embodiment, the printing layer 530 may be formed on a first surface (e.g., the first surface 520a of FIG. 7) of the base layer 520. According to another embodiment, the printing layer 530 may be formed on a second surface (e.g., the second surface 520b of FIG. 6) of the base layer 520.

According to various embodiments, the step S210 of forming the printing layer on the base layer may be performed in various manners. For example, the adhesive layer 510 may be applied to the base layer 520 or the printing layer 530. According to an embodiment, when the printing layer 530 is formed on the first surface 520a which is the upper surface of the base layer 520 (e.g., FIG. 7), the adhesive layer 510 may be applied to the fifth surface 530a which is the upper surface of the printing layer 530. According to another embodiment, when the printing layer 530 is formed on the second surface 520b which is the lower surface of the base layer 520 (e.g., FIG. 6), the adhesive layer 510 may be applied to the first surface 520a which is the upper surface of the base layer 520.

According to various embodiments, the step S230 of forming the shielding printing layer may be performed in various manners. According to an embodiment, the shielding printing layer 540 may be printed to face the second surface 520b. For example, when the printing layer 530 is formed on the first surface 520a which is the upper surface of the base layer 520 (e.g., FIG. 7), the shielding printing layer 540 may be applied to the second surface 520b which is the lower surface of the base layer 520. As another example, when the printing layer 530 is formed on the second surface 520b which is the lower surface of the base layer 520 (e.g., FIG. 6), the shielding printing layer 540 may be applied to the sixth surface 530b which is the lower surface of the printing layer 530.

According to various embodiments of the disclosure, an electronic device (e.g., the electronic device of FIG. 1) may comprise a housing (e.g., the housing 310 of FIG. 1) including a translucent ceramic member (e.g., the ceramic member 400 of FIG. 5) and a printing film (e.g., the printing film 500 of FIG. 5) disposed under the housing. The printing film may include an adhesive layer (e.g., the adhesive layer 510 of FIG. 5) disposed under the ceramic member, a base layer (e.g., the base layer 520 of FIG. 5) including a first surface (e.g., the first surface 520a of FIG. 5) facing the adhesive layer and a second surface (e.g., the second surface 520b of FIG. 5) formed in a direction opposite to the first surface, a printing layer (e.g., the printing layer 530 of FIG. 5) formed on the first surface or the second surface and displayed through the ceramic member and the adhesive layer to an outside of the electronic device, and a shielding printing layer (e.g., the shielding printing layer 540 of FIG. 5) facing the second surface.

According to various embodiments, the ceramic member may be formed overall in a uniform color.

According to various embodiments, a thickness of the base layer may be 25 μm to 100 μm.

According to various embodiments, a thickness of the adhesive layer may be 5 μm to 50 μm.

According to various embodiments, the printing layer may be formed on the first surface, and the shielding printing layer may be positioned under the base layer.

According to various embodiments, the printing layer may be formed on the second surface, and the shielding printing layer may be positioned under the printing layer.

According to various embodiments, the ceramic member may include yttria-stabilized zirconia (YSZ).

According to various embodiments, a light transmittance of the ceramic member may be 40% to 60%.

According to various embodiments, the housing may include a front plate (e.g., the front plate 302 of FIG. 1), a rear plate (e.g., the rear plate 311 of FIG. 2), and a side member (e.g., the side member 318 of FIG. 1) surrounding a space between the front plate and the rear plate. The rear plate may be formed of the ceramic member.

According to various embodiments, the base layer may include polyethylene terephthalate (PET).

According to various embodiments, the printing layer may be formed on the printing layer by at least one of gravure printing, transfer printing, ultraviolet printing, or digital printing.

According to various embodiments, the ceramic member may include a third surface (e.g., the third surface 400a of FIG. 5) exposed to the outside of the electronic device and a fourth surface (e.g., the fourth surface 400b of FIG. 5) facing the adhesive layer. A plurality of recesses (e.g., the recess 430 of FIG. 8) may be formed in at least a portion of the third surface.

According to various embodiments, the density of the ceramic member may be 6.00 g/cm$^3$ to 6.20 g/cm$^3$.

According to various embodiments, the printing layer may include a first area, a second area, and a third area, and the first area, the second area, and the third area may have different colors.

According to various embodiments, at least one of a color, a pattern, or a character may be printed on the printing layer.

According to various embodiments, the printing layer may include a first printing layer formed on the first surface and a second printing layer formed on the second surface.

According to various embodiments of the disclosure, a printing film (e.g., the printing film 500 of FIG. 5) may include an adhesive layer (e.g., the adhesive layer 510 of FIG. 5), a base layer (e.g., the base layer 520 of FIG. 5) including a first surface (e.g., the first surface 520a of FIG. 5) facing the adhesive layer and a second surface (e.g., the second surface 520b of FIG. 5) formed in a direction opposite to the first surface, a printing layer (e.g., the printing layer 530 of FIG. 5) formed on at least one of the first surface or the second surface and visible from outside through the adhesive layer, and a shielding printing layer (e.g., the shielding printing layer 540 of FIG. 5) facing the second surface.

According to various embodiments, at least one of a color, a pattern, or a character may be printed on the printing layer.

According to various embodiments, a thickness of the base layer may be 25 μm to 100 μm.

According to various embodiments, a thickness of the adhesive layer may be 5 μm to 50 μm.

According to various embodiments, the base layer may include polyethylene terephthalate (PET).

It is apparent to one of ordinary skill in the art that an electronic device including a printing film according to various embodiments of the disclosure as described above are not limited to the above-described embodiments and those shown in the drawings, and various changes, modifications, or alterations may be made thereto without departing from the scope of the present invention.

What is claimed is:

1. An electronic device comprising:
a housing comprising a translucent ceramic member; and
a printing film provided on the housing,
wherein the printing film comprises:
an adhesive layer provided on the ceramic member;
a base layer comprising a first surface facing the adhesive layer and a second surface opposite to the first surface;
a printing layer provided on the first surface of the base layer, the printing layer being viewable through the ceramic member and the adhesive layer; and
a shielding printing layer facing the second surface of the base layer.

2. The electronic device of claim 1, wherein the ceramic member is a uniform color.

3. The electronic device of claim 1, wherein a thickness of the base layer is 25 μm to 100μm.

4. The electronic device of claim 1, wherein a thickness of the adhesive layer is 5μm to 50μm.

5. The electronic device of claim 1, wherein the printing layer is provided on the first surface of the base layer, and the shielding printing layer is provided on the second surface of the base layer.

6. The electronic device of claim 1, wherein the ceramic member comprises yttria-stabilized zirconia (YSZ).

7. The electronic device of claim 1, wherein a light transmittance of the ceramic member is 40% to 60%.

8. The electronic device of claim 1, wherein the housing further comprises a front plate, a rear plate formed by the ceramic member, and a side member surrounding a space between the front plate and the rear plate.

9. The electronic device of claim 1, wherein the base layer comprises polyethylene terephthalate (PET).

10. The electronic device of claim 1, wherein the printing layer is formed on the printing layer by at least one of gravure printing, transfer printing, ultraviolet printing, or digital printing.

11. The electronic device of claim 1, wherein the ceramic member comprises a third surface exposed to an outside of the electronic device and a fourth surface facing the adhesive layer, and
wherein a plurality of recesses are formed in at least a portion of the third surface.

12. The electronic device of claim 1, wherein the printing layer comprises a first area, a second area, and a third area, and
wherein the first area, the second area, and the third area are different colors from each other.

13. The electronic device of claim 1, wherein at least one of a color, a pattern, or a character is printed on the printing layer.

14. An electronic device comprising:
a housing comprising a translucent ceramic member; and
a printing film provided on the housing,
wherein the printing film comprises:
an adhesive layer provided on the ceramic member;
a base layer comprising a first surface facing the adhesive layer and a second surface opposite to the first surface;
a printing layer provided on the first surface or the second surface of the base layer, the printing layer being viewable through the ceramic member and the adhesive layer; and
a shielding printing layer facing the second surface of the base layer,
wherein the printing layer is provided on the second surface of the base layer, and
wherein the shielding printing layer contacts the printing layer.

15. An electronic device comprising:
a housing comprising a translucent ceramic member; and
a printing film provided on the housing,
wherein the printing film comprises:
an adhesive layer provided on the ceramic member;
a base layer comprising a first surface facing the adhesive layer and a second surface opposite to the first surface;
a printing layer provided on the first surface or the second surface of the base layer, the printing layer being viewable through the ceramic member and the adhesive layer; and
a shielding printing layer facing the second surface of the base layer,
wherein the printing layer comprises a first printing layer provided on the first surface of the base layer and a second printing layer provided on the second surface of the base layer.

* * * * *